United States Patent

Park

[11] Patent Number: 5,818,660
[45] Date of Patent: Oct. 6, 1998

[54] LOADING WORM GUIDE APPARATUS

[75] Inventor: Tae-won Park, Suwon, Rep. of Korea

[73] Assignee: Samsung Electronics Co., Ltd., Kyungki-Do, Rep. of Korea

[21] Appl. No.: 678,599

[22] Filed: Jul. 15, 1996

[30] Foreign Application Priority Data

Jul. 15, 1995 [KR] Rep. of Korea ......................... 95-17482
Feb. 22, 1996 [KR] Rep. of Korea ........................... 96-4180

[51] Int. Cl.⁶ .................................................... G11B 5/027
[52] U.S. Cl. .......................................................... 360/85
[58] Field of Search ............................... 360/85, 95, 137; 369/97.01, 97.04

[56] References Cited

U.S. PATENT DOCUMENTS

| | | | |
|---|---|---|---|
| 4,956,732 | 9/1990 | Moriyama | 360/85 |
| 4,991,039 | 2/1991 | Kaku | 360/85 |
| 5,004,207 | 4/1991 | Ishikawa et al. | 360/97.02 |

FOREIGN PATENT DOCUMENTS 57-127960  9/1982  Japan ......................................... 360/85

*Primary Examiner*—Allen T. Cao
*Attorney, Agent, or Firm*—Sughrue, Mion, Zinn, Macpeak & Seas, PLLC

[57] ABSTRACT

An internal structure of an apparatus using a loading motor such as a video cassette recorder or a camcoder and, more particularly, a loading worm guide apparatus is provided and includes a bracket structure for preventing a worm gear, which has received an axial thrust while being driven by a loading motor, from being disengaged. A conventional loading worm guide apparatus cannot adaptively adjust to the change of the state of a loading worm since a bracket is fixed to a main chassis. In contrast, the present loading worm guide apparatus interposes an elastic member between a bracket and a main chassis and can adjust a distance between the loading worm and the bracket by tightening or loosening a screw.

5 Claims, 3 Drawing Sheets

LOADING WORM GUIDE APPARATUS

BACKGROUND OF THE INVENTION

The present invention relates to an internal structure of an apparatus using a loading motor such as a video cassette recorder or a camcoder and, more particularly, to a loading worm guide apparatus having a bracket structure for preventing a worm gear which has received an axial thrust while being driven by a loading motor, from being disengaged.

Generally, an apparatus using a magnetic tape includes a loading motor for loading a magnetic tape onto a magnetic head. The power of the loading motor is transmitted via various gears so that the magnetic tape is loaded onto the magnetic head.

FIG. 1A is an exploded perspective view of a deck for a certain apparatus in which a loading motor is installed. FIG. 1B is an enlarged perspective view of a bracket of FIG. 1A. A main chassis 40 is shown in FIG. 1A, on which various components, such as a loading guide 42 for guiding a magnetic tape during load of the magnetic tape, are installed. A first throughhole 44 for installing a head drum (not shown) is formed on one side of the main chassis 40. A second throughhole 46 is installed near one corner of the main chassis 40 and beside the first throughhole 44. A loading motor 10 is fixedly installed on the second throughhole 46 of the main chassis 40 by means of a screw. A loading worm 20 installed in the loading motor passes through the second throughhole 46 to protrude out below the main chassis 40. The reason resides in a fact that a worm wheel (not shown) for receiving power from the loading worm 20 and loading a magnetic tape is installed toward the lower side of the main chassis 40.

A bracket 50 is fixedly installed below the loading motor 10, that is, on the bottom surface of the main chassis 40 below the second throughhole 46, by means of a screw. The bracket 50 prevents the loading worm 20 from being disengaged. One side of the bracket 50 is concavely formed as can be seen from FIG. 1B. This allows the loading worm 20 to protrude toward the lower side of the main chassis 40 by a predetermined length, and prevents the loading worm 20 from being disengaged as well.

First and second deck brackets 48 and 49 shown in the lower side of the main chassis 40 are fixed on the lower side of the main chassis 40 by means of screws.

As described above, a loading worm is engaged with a loading motor, to transmit the power of the loading motor to a loading mechanism. A worm wheel is engaged with the loading worm and the rotational direction changes according to that of the loading worm. In this case, the loading worm is subject to receive a thrust in the reverse direction of the rotational direction of the worm wheel. To prevent the loading worm from being disengaged with the loading motor by the thrust, a loading worm guide apparatus is installed in a main chassis. A conventional loading worm guide apparatus will be described in more detail with reference to FIG. 2.

FIG. 2 is a view of the structure of a conventional loading worm guide apparatus. In FIG. 2, a worm 20 is coupled with the shaft 11 of a loading motor 10. The worm 20 is pressurized and fixed (i.e., press-fitted) on the shaft 11. A worm wheel 30 is engaged with the worm 20. A loading mechanism for loading a magnetic tape is coupled with the worm wheel 30. That is, if the worm 20 rotates clockwise or counterclockwise by the drive of the loading motor 10, the worm wheel 30 rotates in a first or second direction, in order to perform a loading or unloading operation. In this case, the worm 20 is subject to receive a thrust in the axial direction of the shaft 11, to thereby create an infinitesimal displacement in the axial direction. The thrust works in the direction where the worm 20 is engaged or the worm 20 is disengaged according to the rotational direction of the worm 20. For example, when the loading motor 10 of FIG. 2 is driven in the clockwise direction, the worm 20 is subject to receive the thrust in the up-direction, while when the former is driven in the counterclockwise direction, the worm 20 is subject to receive the thrust in the down-direction.

In FIG. 2, a bracket 50 is installed on the main chassis 40, to prevent the worm 20 from being disengaged. The bracket 50 is disposed at the lower side of the worm 20 to support the worm 20 when the worm 20 becomes displaced downwards due to the thrust, to prevent the worm 20 from being disengaged from the shaft 11 by more than a predetermined distance. Both ends of the bracket 50 are fixed to the main chassis 40. The worm 20 and the bracket 50 are installed at an infinitesimal distance spaced from each other, usually at a distance between 0.06 mm and 0.25 mm.

In the conventional loading worm guide apparatus described with reference to FIG. 2, since the bracket is fixed on the main chassis, the distance between the loading worm and the bracket cannot be adjusted. Accordingly, when the loading worm is subject to receive a large amount of axial thrust, noise is generated due to the fact that the loading worm contacts the bracket. In some instances, the loading motor is not driven due to a phenomenon wherein the loading worm is stuck to the bracket. In the conventional loading motor guide apparatus, the bracket should be replaced by another bracket when an old component is replaced by a new component to meet the load variation applied to the loading motor.

SUMMARY OF THE INVENTION

To solve the above problem, it is an object of the present invention to provide a loading worm guide apparatus which can adaptively adjust a distance between a loading worm and a bracket to avoid noise generation, can avoid a phenomenon wherein the drive of a loading motor stops due to adherence of the loading worm to the bracket, and can adaptively enable the replacement of components.

To accomplish the above object of the present invention, there is provided a loading worm guide apparatus which is installed on a main chassis of one of a video cassette recorder and a camcorder having a loading motor, a loading worm which is coupled to a shaft of the loading motor to rotate, and a worm wheel which is engaged with the loading worm to rotate, the loading worm guide apparatus being operative to prevent the loading worm from being disengaged, the loading worm guide apparatus comprising:

a bracket which is disposed at a distance spaced from the loading worm on a path where the loading worm can be disengaged from the shaft of the loading motor;

an elastic member disposed between the main chassis and the bracket; and a screw member for coupling the bracket to the main chassis and adjusting the distance between the loading worm and the bracket according to the coupling state.

BRIEF DESCRIPTION OF THE DRAWINGS

The preferred embodiments are described with reference to the drawings, wherein.

DETAILED DESCRIPTION OF THE PREFERRED EMBODIMENT

A preferred embodiment of the present invention will be described below in more detail with reference to FIG. 3.

Figure 1A:
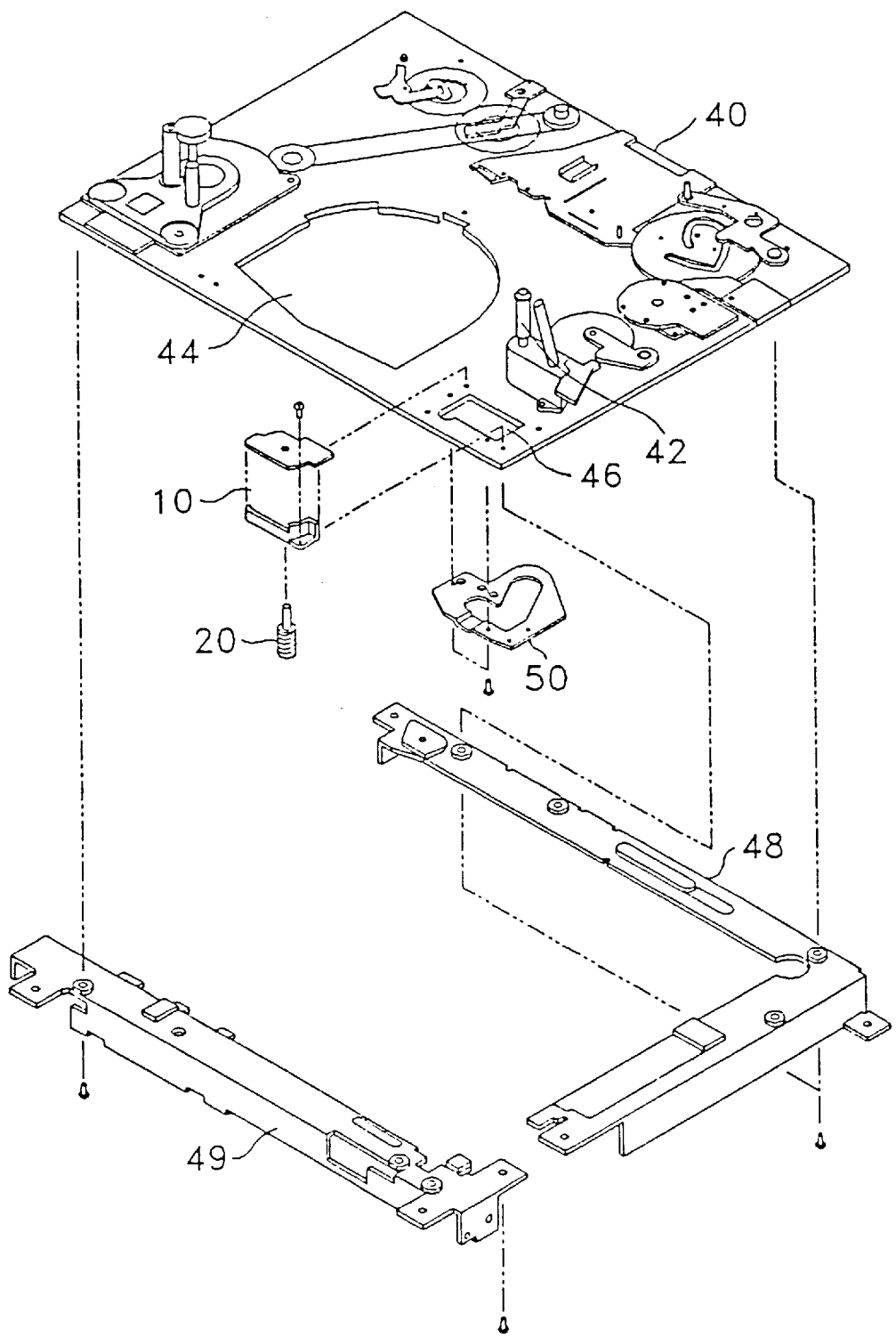
FIG. 1A is an exploded perspective view of a deck for a certain apparatus in which a loading motor is installed.
Figure 1B:
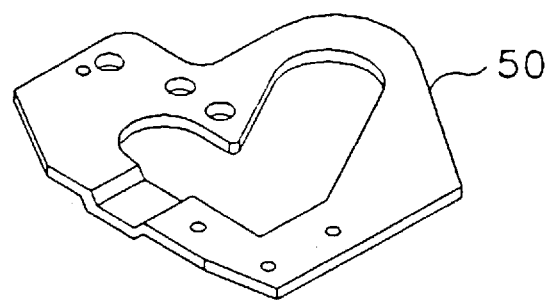
FIG. 1B is an enlarged perspective view of a bracket of FIG. 1A.
Figure 2:
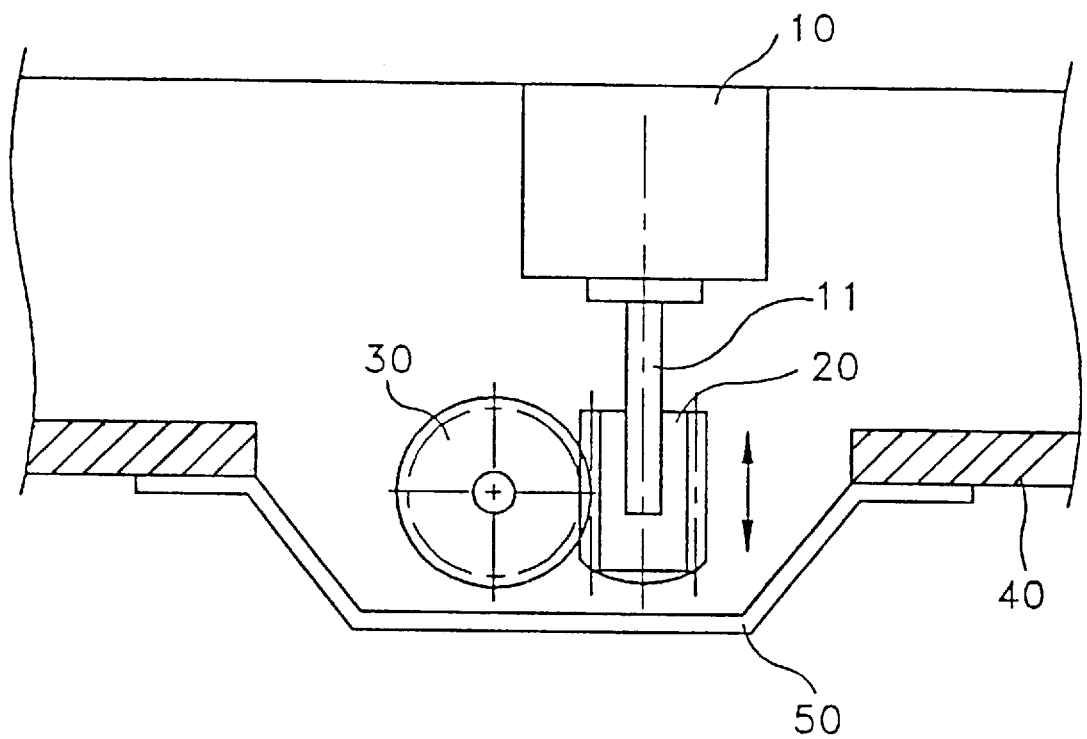
FIG. 2 is a view of the structure of a conventional loading worm guide apparatus.
Figure 3:
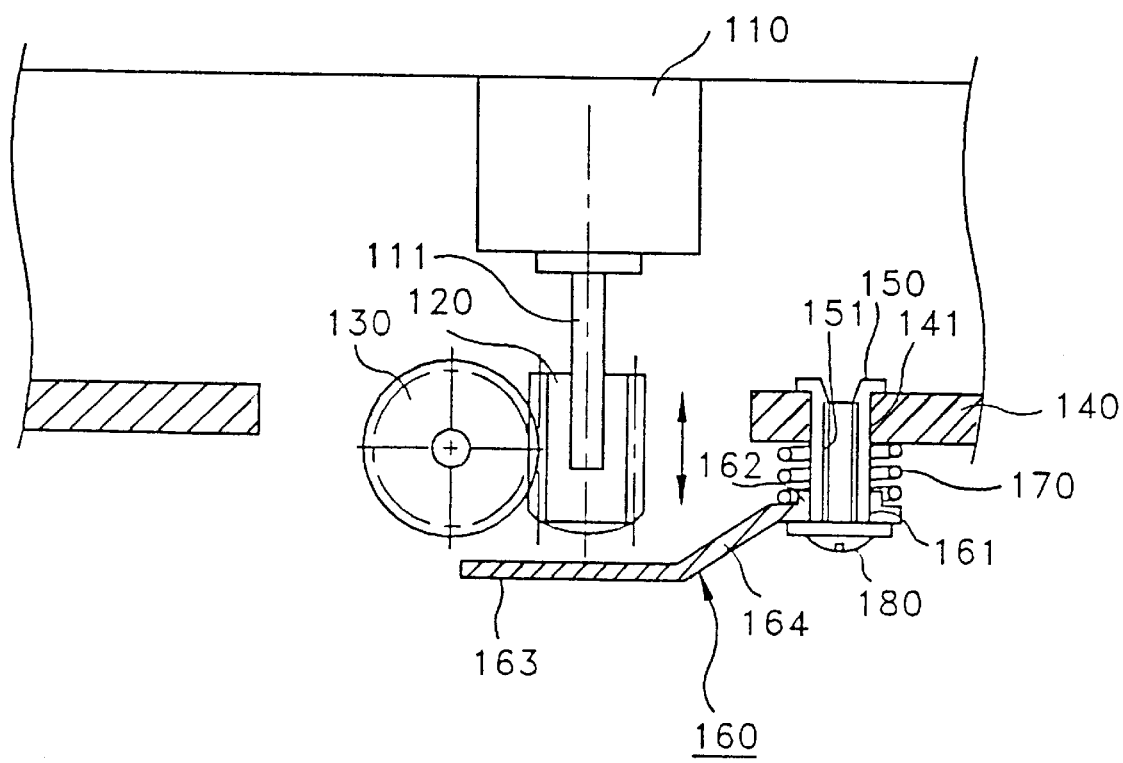
FIG. 3 is a view of the structure of a loading worm guide apparatus according to the present invention.

In FIG. 3, showing the structure of a loading worm guide apparatus according to the present invention, a worm 120 is coupled with the shaft 111 of a loading motor 110. The worm 120 is pressurized and fixed, such as by press-fitting on the shaft 111. A worm wheel 130 is engaged with the worm 120. A loading mechanism for loading a magnetic tape is coupled with the worm wheel 130. That is, if the worm 120 rotates clockwise or counterclockwise by the drive of the loading motor 110, the worm wheel 130 rotates in a first or second direction, in order to perform a loading or unloading operation.

In this case, the worm 120 is subject to receive a thrust in the axial direction of the shaft 111, to thereby create an infinitesimal displacement in the axial direction. The thrust works in the direction where the worm 120 is engaged or the worm 120 is disengaged according to the rotational direction of the worm 120. For example, when the loading motor 110 of FIG. 3 is driven in the clockwise direction, the worm 120 is subject to receive the thrust in the up-direction, while when the loading motor 110 is driven in the counterclockwise direction, the worm 120 is subject to receive the thrust in the down-direction.

In FIG. 3, an installation hole 141 of a bracket 160 is formed in the main chassis 140. A bush 150 is inserted into the bracket installation hole 141. A female screw thread 151 is formed on the internal surface of the bush 150. A cantilever-shaped bracket 160 and an elastic member 170 are coupled with the bush 150. A bush insertion hole 161 where the bush is installed is formed in the bracket 160. Protrusions 162, on which the elastic member 170 is installed along around the bush insertion hole 161, are formed on the bracket 160. That is, the elastic member 170 is fixed over the protrusions 162 and is installed between the bracket 160 and the main chassis 140. The bracket 160 is disposed below the loading worm 120 of FIG. 3, which includes a flat portion 163 for preventing the loading worm 120 from being disengaged and a curved portion 164 for solving the limit of the installation space. Of course, the present invention is not limited to making the bracket 160 have the shape shown in FIG. 3, but it is possible to modify the bracket 160 into various shapes. The cantilever-shaped bracket 160 has an elastic force with respect to the main chassis 140. If the bracket 160 is elastically installed, the bracket 160 sags down when the loading worm 120 contacts the bracket 160. Accordingly, a frictional force between the bracket 160 and the loading worm 120 is reduced, and the drive of the loading motor 110 will not stop. A screw 180 is coupled with the female screw thread 151 of the bush 150. A distance between the bracket 160 and the loading worm 120 can be adjusted by tightening or loosening the screw 180. In this case, since the bracket 160 is supported by the elastic member 170, a stable state is maintained.

In other words, since the elastic member 170 is interposed between the main chassis 140 and the bracket 160 in the loading worm guide apparatus according to the present invention, the distance between the bracket 160 and the loading worm 120 can be adjusted by tightening or loosening the screw 180. As a result, when the loading worm 120 receives a large amount of the thrust, contact between the bracket 160 and the loading worm 120 is avoided, such that noise is not generated. Also, since the bracket 160 sags down even in an inevitable contact between the loading worm 120 and the bracket 160, an undesired stoppage of the loading motor 110 does not occur.

Although a bracket normally should be replaced by another bracket when an old component is replaced by a new component to meet the load variation applied to the loading motor in the conventional loading motor guide apparatus, the loading worm guide apparatus according to the present invention does not require replacement of the bracket but rather can compensate by tightening or loosening the screw.

While only certain embodiments of the invention have been specifically described herein, it will be apparent that numerous modifications may be made thereto without departing from the spirit and scope of the invention.

What is claimed is:

1. A loading worm guide apparatus which is installed on a main chassis of one of a video cassette recorder and a camcorder having a loading motor, a loading worm which is coupled to a shaft of the loading motor to rotate, and a worm wheel which is engaged with the loading worm to rotate, the loading worm guide apparatus being operative to prevent the loading worm from being disengaged from the shaft of said loading motor, the loading worm guide apparatus comprising:

a bush fixed to said main chassis and protruding beyond said main chassis;

a bracket slidably mounted on said bush at a distance spaced from said loading worm on a path where said loading worm moves axially with respect to the shaft of said loading motor;

an elastic member positioned between said main chassis and said bracket so as to bias said bracket with respect to said main chassis, said elastic member being coaxial with said bush; and a screw member coupled to said bush thereby to mount said bracket to said main chassis, said screw member being operative to adjust the distance between said loading worm and said bracket.

2. The loading worm guide apparatus according to claim 1, wherein said bracket is coupled with said main chassis so as to have an elastic force in the form of a cantilever.

3. The loading worm guide apparatus according to claim 2, wherein a bracket installation hole is formed in said main chassis, and wherein said bush is inserted into said bracket installation hole, said bush having an internal surface formed with a female screw thread which receives said screw member.

4. The loading worm guide apparatus according to claim 3, wherein said bracket includes a bush insertion hole through which said bush is inserted, and protrusions which protrude toward said main chassis around said bush insertion hole and which fix said elastic member in place.

5. The loading worm guide apparatus according to claim 1, wherein said bracket has a curved portion according to a shape of an installation space.

* * * * *